No Printed Specification Available
6149X
Nichols & Fairbanks.
Hemp and Flax Brake.
Patented Oct. 1, 1830.
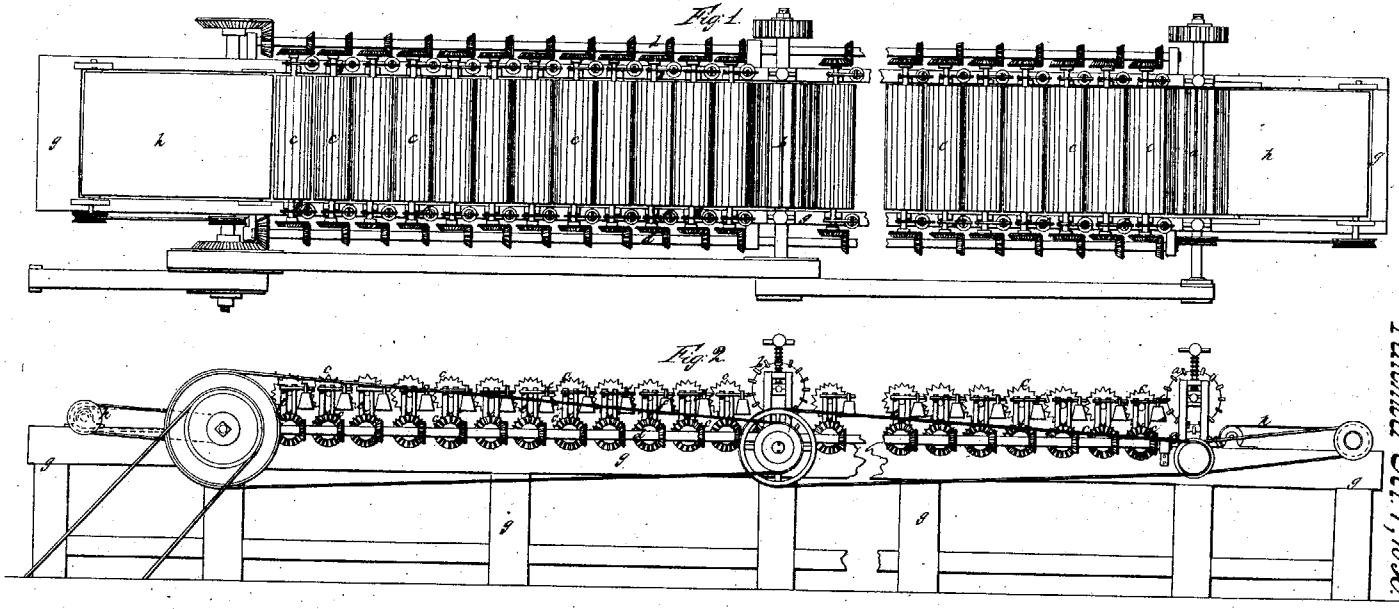

Ethan H. Nichols & Thaddeus Fairbanks. St Johnsbury Vermont.

Letters Patent

The Schedule referred to in these Letters Patent and making part of the same containing a description in the words of the said Ethan H. Nichols and Thaddeus Fairbanks themselves of their improvement being a Hemp and Flax Dresser To all persons to whom these presents shall come. Ethan H. Nichols of Hardwick and Thaddeus Fairbanks of St Johnsbury in the County of Caledonia & State of Vermont send Greeting Be it known that We the said Thaddeus Fairbanks and Ethan H Nichols have invented constructed made and applied to use a new and useful improvement for a Hemp and Flax dresser designed to be applied to any or all such Hemp and Flax Machines as are constructed with revolving brake rollers. The following is a full and exact description of the construction and operation of said improvement as invented or improved by us. 1st A wooden Roll corresponding in length to the brake Rollers of the Hemp and Flax Machine to which it is applied thro' which is driven an iron shaft which serves for gudgeons 2nd Iron blades or wings extending the whole length of the roll and projecting laterally an inch or more from the surface of the roll and about 2 inches apart These blades may be confined in parallel grooves & if made of cast iron they may be double and confined by screws or bolts their edges may be straight or indented. The rolls with the blades thus affixed may be called dressers. Two of these dressers are placed one above the other so near together so that the blades play and mash into each other like cog or gear wheels upon shafts of the dressers equalize their revolutions, and motion is given to them by a belt or pulley wheel attached to one of them. The following is a description of the Hemp and Flax machines, as constructed upon the principle of Hines and Bain and is introduced here for the purpose of explaining the operation of the improvement as invented by us when applied to said Hines & Bain's Machine

6149X

A number of pairs of fluted brake rollers 4 or 5 inches in diameter
(usually 65 or 70 pairs) are placed in iron stands supported by a frame
of wood. the top Rollers are level weighted at each end and rise upon
the bottom ones and the pairs lie side by side so closely as to receive the
flax or Hemp from one pair to another until it passes thro the whole range
Upon each side of the machine extending the whole length is an iron shaft
supported upon the wooden frame aforesaid. Small bevel wheels affix
ed to these shafts connect at right angles with wheels upon the ends
of the bottom Rollers and the whole is propelled by a power at the [illegible]
of the machine. The rollers lie in a horizontal position. the whole range
forming a level flat surface and the flax or hemp is conducted into
the machine by a moving apron upon which it is spread and is
received upon another apron at the foot of the machine.
In applying our improvement to Hines and Burns machine as described
two or more pairs of droppers are placed at the foot of the machine between
the last pair of fluted brake Rollers & the rollers connected with the apron
and are turned in the same direction as the fluted Brake Rollers, but
with far greater velocity. one or more pairs of droppers may also be inser
ted at convenient distances in different parts of the machine & should
the [illegible] of the droppers exceed that of the brake rollers the relative situation
should be such as to [illegible] with the collateral brake rollers the Hemp
or flax passes from the brake rollers between the droppers and is receiv
ed by the next pair of brake rollers or by the rollers connected with the
apron at the foot of the machine and as the progress of the [illegible] thro
the machine is gradual the action of the droppers operates to dislodge
the [illegible] which the brake rollers immediately preceding serve the
double purpose of breaking the [illegible] and of holding the fibre during
the operation of the droppers. In testimony that the above is a
true specification of the construction and operation of our said improvement
we have hereunto set our hands and seals this 6th day of September
in the year of our Lord one thousand eight hundred and thirty –

Witness { Hiram Moore
{ John Barney

Ethan [illegible]
Thaddeus Fairbanks

[illegible]
[illegible]